United States Patent
Holt et al.

(10) Patent No.: US 7,364,003 B2
(45) Date of Patent: Apr. 29, 2008

(54) SYSTEMS AND METHODS FOR THE MITIGATION OF HOP

(75) Inventors: Bradford Jay Holt, Edwards, IL (US); John Andrew Yeoman, Dunlap, IL (US); Michael Dan Strnad, Morton, IL (US); Stephen Victor Lunzman, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 457 days.

(21) Appl. No.: 11/066,192

(22) Filed: Feb. 25, 2005

(65) Prior Publication Data

US 2006/0191692 A1 Aug. 31, 2006

(51) Int. Cl.
*B60K 17/00* (2006.01)

(52) U.S. Cl. ............... 180/345; 180/338; 701/82; 701/90

(58) Field of Classification Search ............... 180/345, 180/338, 24.06, 242, 243, 197; 701/82, 90; 280/5.515, 5.519
See application file for complete search history.

(56) References Cited

U.S. PATENT DOCUMENTS

| | | | |
|---|---|---|---|
| 4,183,419 A | 1/1980 | Henn et al. | |
| 4,765,648 A * | 8/1988 | Mander et al. | 280/5.519 |
| 5,147,010 A | 9/1992 | Olson et al. | |
| 5,361,208 A | 11/1994 | Olson et al. | |
| 5,474,147 A | 12/1995 | Yesel et al. | |
| 5,897,130 A * | 4/1999 | Majeed et al. | 280/5.507 |
| 6,401,853 B1 * | 6/2002 | Turski et al. | 180/197 |
| 6,644,429 B2 | 11/2003 | Evans et al. | |
| 6,882,920 B2 * | 4/2005 | Rudd, III | 701/71 |
| 7,142,956 B2 * | 11/2006 | Heiniger et al. | 701/23 |
| 2003/0040403 A1 | 2/2003 | Miller | |

* cited by examiner

*Primary Examiner*—Paul N. Dickson
*Assistant Examiner*—Drew J. Brown
(74) *Attorney, Agent, or Firm*—Finnegan, Henderson, Farabow, Garrett & Dunner (57) ABSTRACT

A system for mitigating hop in a propelled machine is provided. A controller is operable to receive an aggressiveness command based on an operator input. A sensor is operable to measure a parameter indicative of hop and output a hop signal indicative of a magnitude of machine hop, based on the measurement. A manager is operable to reduce an aggressiveness indicated by the aggressiveness command in proportion to the indicated magnitude of machine hop.

34 Claims, 3 Drawing Sheets

SYSTEMS AND METHODS FOR THE MITIGATION OF HOP

TECHNICAL FIELD

The present disclosure relates generally to the control of the operating parameters of a self-propelled work machine and, more particularly, to the mitigation of hop in a self-propelled work machine.

BACKGROUND

Self-propelled work machines, such as motor graders, are often required to operate on uneven terrain or in other poor traction conditions. To provide better traction, these machines are often equipped with an all-wheel drive (AWD) system. In poor traction conditions, the front wheels of an AWD machine, normally used for steering, may also be driven to increase traction. For example, a motor grader may be operated in an AWD mode in order to obtain maximum traction when grading on a side slope or removing snow from a roadway.

However, in certain traction conditions, such as in snow or on loose earth, AWD machines may experience a bouncing condition known as "hop." Hop may occur when the driven front wheels of the machine experience poor traction conditions that cause them to alternately spin, thus making a depression in the surface, and then stick, thus thrusting the front of the machine upward as the front wheels climb the forward wall of the depression that was just made. If the force of the thrust is great enough, the front wheels of the machine may actually hop off the ground, though this is not necessarily the case. When the weight of the front of the machine comes back down, the front wheels may create another depression, thus causing the machine to hop again. These hops may become resonant at a particular low frequency (e.g., 2-3 Hz), depending upon the configuration of the machine.

Hop has several undesirable effects. For example, hop may cause the machine to lose traction, and thus operate inefficiently. Also, it may result in excess force being applied to the front wheel suspension as the machine hops. Further, excess hop may cause damage to the surface that the machine is preparing, e.g., by causing a ground-contacting implement of the machine (such as a grader blade) to bounce as it travels across the surface.

Prior art systems for mitigating hop have been developed. One such system is described in U.S. Pat. No. 5,474,147 to Yesel et al. In this system, the front wheels of the machine are driven by hydraulic motors. Machine hop is detected by sensing fluctuations in hydraulic motor pressure. If fluctuations greater than a certain magnitude and frequency are detected, then a controller decreases the hydraulic motor torque by a predetermined amount.

However, the system described in the '147 patent may be triggered by non-resonant hop, thus leading to inefficient operation of the machine. Further, the controller in this system does not decrease the torque in proportion to the magnitude of machine hop. Consequently, the system may be required to step-down the hydraulic motor torque several times in succession in order to eliminate hop. This may cause the machine to lose speed suddenly, which may be disconcerting to the operator of the machine.

The presently disclosed hop mitigation system is directed to solving one or more of these shortcomings of the prior art hop mitigation systems.

SUMMARY

In one aspect, the present disclosure is directed to a method for mitigating hop in a propelled machine. An aggressiveness command based on an operator input is received. A parameter indicative of hop is measured, and a magnitude of machine hop is determined based on the measurement. An aggressiveness indicated by the aggressiveness command is reduced in proportion to the indicated magnitude of machine hop.

In another aspect, the present disclosure is directed to a system for mitigating hop in a propelled machine. A controller is operable to receive an aggressiveness command based on an operator input. A sensor is operable to measure a parameter indicative of hop and output a hop signal indicative of a magnitude of machine hop, based on the measurement. A manager is operable to reduce an aggressiveness indicated by the aggressiveness command in proportion to the indicated magnitude of machine hop.

It is to be understood that both the foregoing general description and the following detailed description are exemplary and explanatory only, and are not restrictive of the disclosure as claimed.

DETAILED DESCRIPTION

Figure 1:
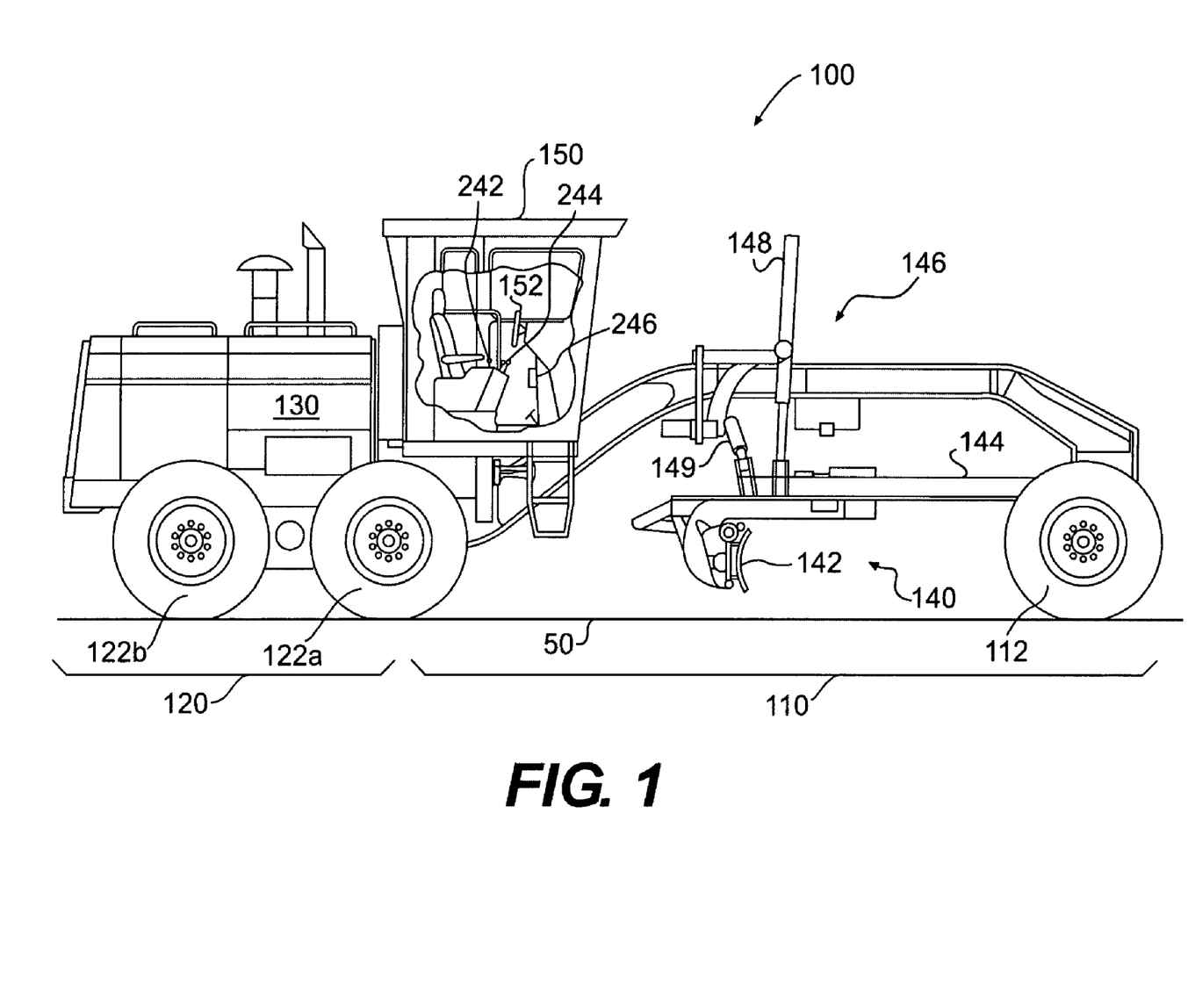
FIG. 1 provides a side view diagrammatic illustration of a work machine having a hop mitigation system in accordance with an exemplary embodiment of the present disclosure.

FIG. 1 illustrates an exemplary self-propelled work machine 100. In the illustrated embodiment, the exemplary machine 100 is a motor grader. However, the disclosed hop mitigation system is not limited to use in motor graders and may be applied to other self-propelled machines.

As illustrated in FIG. 1, self-propelled work machine 100 may include a front frame section 110, supported by steerable front wheels 112, and a rear frame section 120, supported by tandem sets of rear wheels 122a, b. Machine 100 may also include an engine 130, such as an internal combustion engine. Engine 130 may be coupled to drive both front wheels 112 and rear wheels 122a, b via an AWD system (discussed below with reference to FIG. 2).

In an exemplary embodiment of the present disclosure, machine 100 may also include an implement 140 for preparing a ground surface 50. In the illustrated motor grader, for example, implement 140 may include a blade 142 for moving earth or other materials, e.g., in order to grade surface 50. Blade 142 may be coupled to front frame section 110 by a drawbar 144. The position of drawbar 144, and thus of blade 142, relative to front frame section 110 may be controlled by a linkage assembly 146. Linkage assembly 146 may include left and right lift cylinders 148, and a center shift cylinder 149. Left and right lift cylinders 148 independently control the height of the left and right sides of blade 142, respectively, and may thus be used to angle blade 142 relative to surface 50. Center shift cylinder 149 may be used to side-shift drawbar 144, and thus blade 142, relative to front frame section 110. Cylinders 148, 149 may be implemented using, e.g., hydraulic cylinders.

Machine 100 may also include an operator cab 150. Operator cab 150 may include appropriate operator inputs for controlling the operation of machine 100. For example, operator cab 150 may include appropriate inputs that may allow the operator to steer front wheels 112 (e.g., steering input 152), to position implement 140, and to control the speed and forward/reverse direction of machine 100 (discussed below with reference to FIG. 2).

Figure 2:
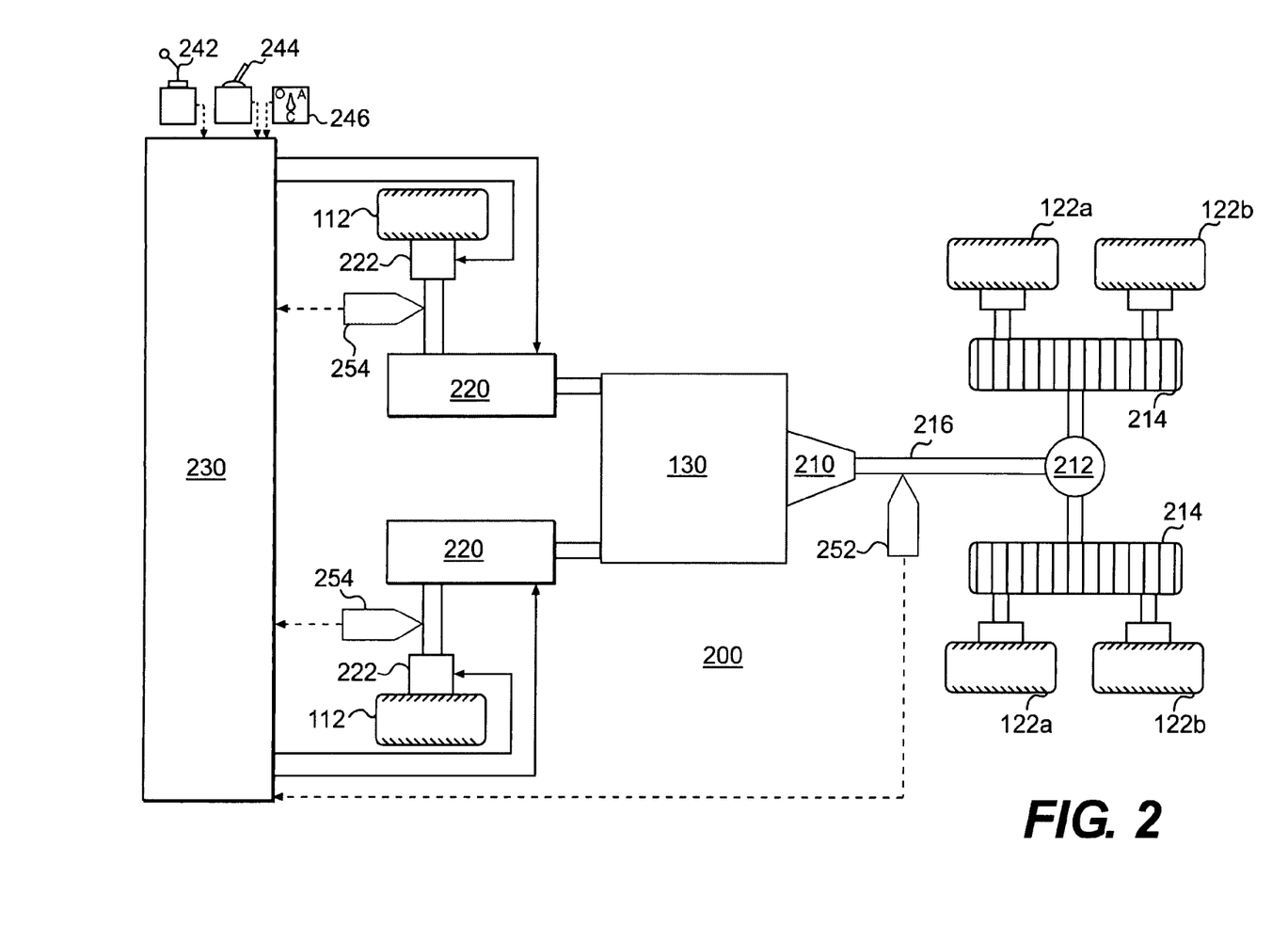
FIG. 2 is a schematic illustration of an AWD machine having a hop mitigation system in accordance with an exemplary embodiment of the present disclosure.

FIG. 2 schematically illustrates an exemplary AWD system 200 for machine 100. As illustrated in FIG. 2, engine 130 of machine 100 may be coupled to drive a set of sprockets (not shown) via a mechanical transmission 210 and differential 212. First and second sets of rear wheels 122a, b may be driven in turn by left and right chain drives 214 coupled to the sprockets. Engine 130 may also be coupled to drive left and right front wheels 112 via left and right hydrostatic transmissions (HYSTATs) 220, and corresponding left and right hydraulic clutches 222. In accordance with an exemplary embodiment of the present disclosure, AWD system 200 may also include an AWD controller 230 for controlling the speed and direction of front wheels 112 based on operator inputs and machine sensors.

In the illustrated embodiment, the operator inputs include a gear selector 242, an aggressiveness input 244 and an AWD mode selector 246. Gear selector 242 may be used to select the direction and speed of an output shaft 216 of mechanical transmission 210. For example, gear selector 242 may be implemented as a gear shift lever operably coupled to mechanical transmission 210. Aggressiveness input 244 may be used to control a speed ratio between two independently controllable transmissions. For example, aggressiveness input 244 may be used to control the speed of front wheels 112 by controlling the speeds of hydrostatic transmissions 220 with respect to the speed of mechanical transmission 210. Mode selector 246 may be used to select between various modes of operation of AWD system 200, as discussed below. Other known operator inputs may also be provided. For example, an inching input, such as an inching pedal (not shown), may be provided in order to allow the operator to modulate the ground speed of machine 100.

The machine sensors in the illustrated embodiment include a mechanical transmission output shaft (TOS) sensor 252 and left and right HYSTAT output speed sensors 254. Mechanical TOS sensor 252 may sense the speed and direction of output shaft 216 of mechanical transmission 210. HYSTAT output speed sensors 254 may sense the output speed of respective HYSTATs 220. Other known machine sensors may also be provided.

AWD controller 230 may include a processor and a computer-readable medium, such as a memory, configured to store one or more control routines (e.g., software) for performing methods consistent with the present disclosure. As shown in FIG. 2, AWD controller 230 may be operably connected to receive input signals from operator inputs 242, 244 and 246 and from machine sensors 252 and 254. Further, as shown in FIG. 2, controller 230 may be operably connected to send commands to HYSTATs 220 and clutches 222 in order to control the direction and speed in which front wheels 112 are driven.

During operation of AWD machine 100, an operator may select a mode of AWD operation using AWD mode selector 246. For example, mode selector 246 may allow the operator to select between OFF, CREEP and MANUAL modes.

The OFF mode may be selected in good traction conditions where the additional traction that would be provided by driving front wheels 112 is not desired. In the OFF mode, AWD system 200 is disengaged, and AWD controller 230 may set front wheel clutches 222 in a neutral position so that machine 100 may be propelled solely by rear wheels 122a, b. The operator may then control the speed and direction of travel of rear wheels 122a, b by using gear selector 242 to select between various gears of mechanical transmission 210.

The CREEP mode may be selected when gear selector 242 is in a neutral position. In the CREEP mode, machine 100 may be propelled solely by driven front wheels 112. The operator may select the CREEP mode, for example, in order to prevent rear wheels 122a, b from damaging a finely graded surface prepared by implement 140. In the CREEP mode, AWD controller 230 may control HYSTATs 222 to drive front wheels 112 at a speed corresponding to the position of aggressiveness input 244 set by the operator. For example, in the CREEP mode, aggressiveness input 244 may be configured to operate as a continuously variable transmission control, e.g., by setting a drive ratio of HYSTATs 220 with respect to front wheels 112.

The MANUAL mode may be selected in poor traction conditions where the operator finds it desirable to increase traction by driving both front wheels 112 and rear wheels 122a, b. When the MANUAL mode is selected, the operator may control the speed and direction of travel of rear wheels 122a, b using gear selector 242. AWD controller 230 may then control the driven direction of front wheels 112 to be the same as that of rear wheels 122a, b. AWD controller 230 may also control the driven speed of front wheels 112 to be equal to the speed of rear wheels 122a, b multiplied by an aggressiveness factor, which may be set by the operator using aggressiveness input 244.

In the MANUAL mode, AWD controller 230 may receive an indication of the direction of rear wheels 122a, b. For example, controller 230 may receive a signal indicative of the direction of output shaft 216 from TOS sensor 252. Alternatively, AWD controller may determine the direction of travel based upon the position of gear selector 242. Other indications of the direction of rear wheels 122a, b will be apparent to those of skill in the art. Controller 230 may then command front wheel clutches 222 to drive front wheels 112 in the same direction as rear wheels 122a, b.

AWD controller 230 may also receive an indication of the speed of rear wheels 122a, b. For example, controller 230 may receive a signal indicative of the speed of rotation of output shaft 216 from TOS sensor 252. However, other indications of the speed of rear wheels 122a, b will be apparent to those of skill in the art. Controller 230 may then control HYSTATs 220 to drive the front wheels 112 at a speed equal to the speed of rear wheels 122a, b multiplied by an operator-commanded aggressiveness factor $A_{cmd}$ corresponding to a desired ratio of the speed of front wheels 112 to the speed of rear wheels 122a, b.

The aggressiveness factor $A_{cmd}$ may be commanded by the operator using aggressiveness input 244. Aggressiveness input 244 may be implemented using any analog or digital input device, such as a dial, a lever, a pedal, a touch screen, buttons, etc., that may output a signal suitable for indicating the aggressiveness factor $A_{cmd}$. The value of the operator-commanded aggressiveness factor $A_{cmd}$ may be based at least partially on a position of aggressiveness input 244. For example, the value of $A_{cmd}$ may be proportional to the position of aggressiveness input 244.

In an exemplary embodiment of the present disclosure, AWD controller 230 may include a map or table that sets a linear or non-linear relationship between the position of aggressiveness input 244 and the aggressiveness factor $A_{cmd}$. In another exemplary embodiment, controller 230 may be configured to use mathematical equations that set a linear or non-linear relationship between the position of aggressiveness input 244 and the value of the aggressiveness factor $A_{cmd}$.

In one embodiment of the present disclosure, aggressiveness input 244 may allow the operator to command an aggressiveness factor $A_{cmd}$ that is between 0.90 and 1.20, so that the speed of front wheels 112 may be set to be between 90% and 120% of the speed of rear wheels 122a, b. Where traction conditions are extremely poor, such as when grading on a side slope or when operating in snow or on sand, the selection of a high aggressiveness factor may prevent front wheels 112 from wandering from the direction commanded by the operator, e.g., using steering input 152.

AWD controller 230 may be configured to provide closed-loop control of the speed of front wheels 112 in the MANUAL and/or CREEP modes. In one embodiment, the actual speed of front wheels 112 may be fed back to controller 230 so as to allow for closed loop control of front wheel speed using known algorithms. For example, HYSTAT output speed sensors 254 may feed back the actual output speed of HYSTATs 220 to controller 230 so as to allow closed loop control of the speed of front wheels 112, which is proportional to the output speed of HYSTATs 220 according to a front final gear ratio.

Figure 3:
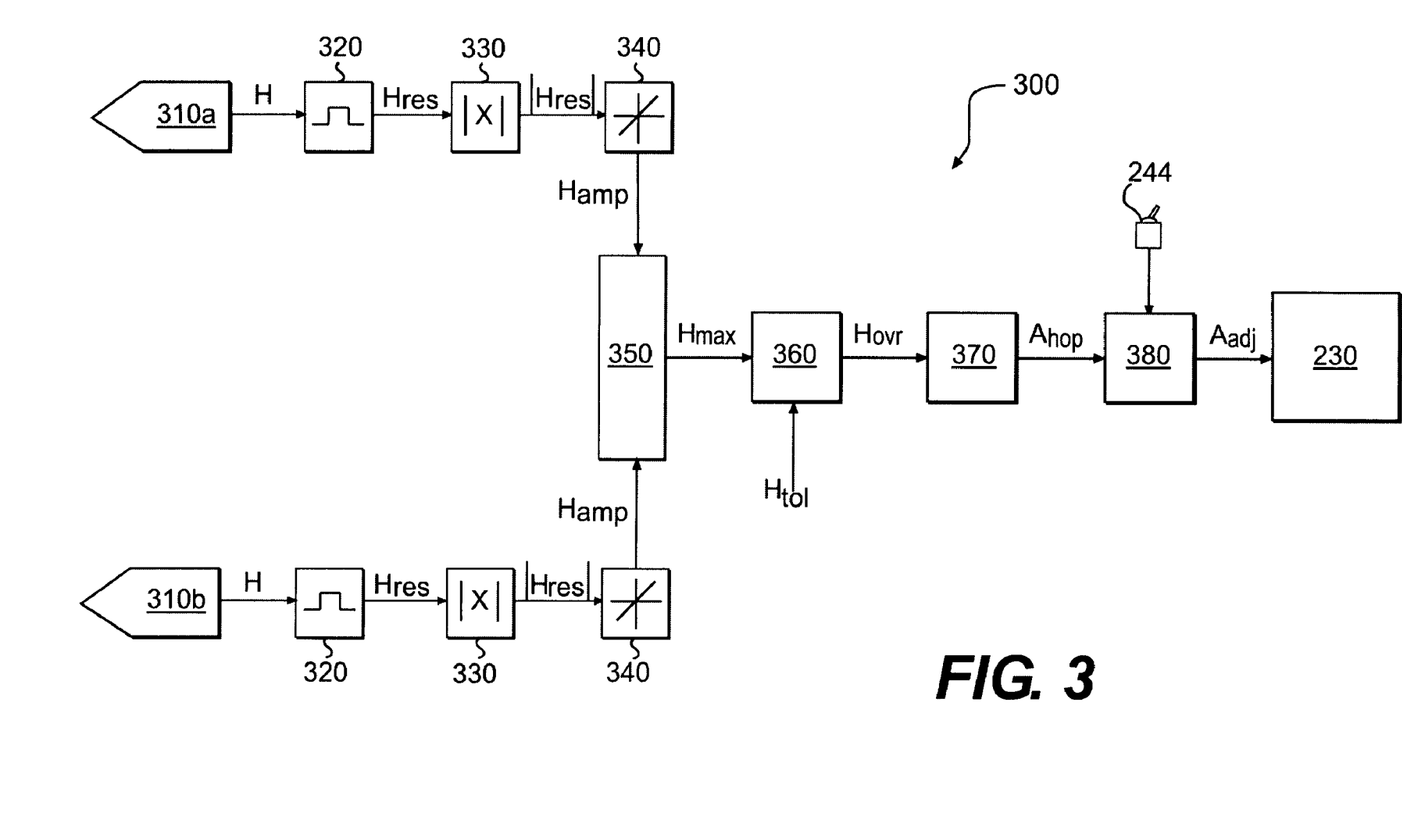
FIG. 3 is a schematic illustration of a hop mitigation system in accordance with an exemplary embodiment of the present disclosure.

If an operator sets an aggressiveness factor $A_{cmd}$ that is too high for the current operating conditions, machine 100 may experience resonant hop. Accordingly, in an exemplary embodiment of the present disclosure, machine 100 may include a hop mitigation system 300 that may limit the operator-commanded aggressiveness factor $A_{cmd}$ to a level that will attenuate or eliminate resonant hop under the current operating conditions of the machine.

FIG. 3 is a functional block diagram of a hop mitigation system 300 according to one embodiment of the present disclosure. Hop mitigation system 300 may include a processor and a computer-readable medium, such as a memory, configured to store one or more control routines (e.g., software) for performing methods consistent with the present disclosure.

Hop mitigation system 300 may be implemented as part of AWD controller 230, e.g., as a sub-routine in the controller software. Alternatively, system 300 may be implemented as a separate unit.

Hop mitigation system 300 may include one or more hop sensors 310. In the embodiment illustrated in FIG. 3, system 300 includes a plurality of hop sensors 310a, b. However, it is to be understood that system 300 may include a single hop sensor 310 without departing from the scope of the present disclosure. Hop sensor 310 may sense a parameter that is indicative of machine hop and output a signal H corresponding to the value of the sensed parameter. For example, hop sensor 310 may measure a parameter which undergoes a change in value that is related to the magnitude of a hop experienced by machine 100. A number of different parameters may be suitable for measurement by hop sensor 310.

For example, hop sensor 310 may measure a parameter that is indicative of the speed of front wheels 112. As machine 100 hops, the speed of front wheels 112 may vary inversely with the load on front wheels 112. That is, as the front of machine 100 hops, the speed of front wheels 112 may spike as front wheels 112 lose contact with surface 50. In order to measure these fluctuations, hop sensor 310 may include left and/or right front wheel speed sensors (not shown). The wheel speed sensor or sensors may be configured to measure parameters indicative of the actual speed of front wheels 112, or of another rotational speed that is related to the speed of front wheels 112. In one embodiment, for example, hop sensor 310 may measure the speed of front wheels 112 based upon the output speed of HYSTATs 220 (e.g., as measured by HYSTAT output speed sensors 254), which is proportional to the speed of front wheels 112 according to a front final drive ratio. Alternatively, the speed of front wheels 112 may be determined by any other appropriate manner known to those skilled in the art.

In another embodiment, hop sensor 310 may measure a load on a component of AWD system 200 that may vary as machine 100 hops. For instance, the pressure of hydraulic fluid in hydrostatic transmissions 220 may vary with the varying load placed on front wheels 112 as machine 100 hops. Accordingly, in an exemplary embodiment of the present disclosure, hop sensor 310 may be implemented using a drive pressure sensor (not shown) configured to detect a current value of the pressure of hydraulic fluid in right and/or left hydrostatic transmissions 220. In some machines, the pressure of hydraulic fluid in front wheel clutches 222 may be related to the pressure in hydrostatic transmissions 220. Accordingly, in one embodiment, hop sensor 310 may be implemented using a clutch pressure sensor (not shown) configured to detect a current value of the pressure of hydraulic fluid in right and/or left hydraulic clutches 222.

Also, the load on HYSTATs 220 may vary directly with the load on front wheels 112 as machine 100 hops. Accordingly, in one embodiment, hop sensor 310 may be implemented using a left and/or right torque sensor (not shown) configured to measure an output torque of left and/or right HYSTATs 220.

Further, front frame section 110 of machine 100 may experience a vertical acceleration and deceleration as machine 100 hops. Accordingly, in another embodiment of the present disclosure, hop sensor 310 may measure acceleration of a front portion of machine 100. For example, hop sensor 310 may include an accelerometer positioned to measure vertical acceleration at a forward portion of front frame section 110 as machine 100 hops.

Also, as machine 100 hops, blade 142 (or other implement 140) may be pressed into surface 50, thus varying a load on blade 142 with each hop. In one embodiment of the present disclosure, hop sensor 310 may measure this variation in load on blade 142, for example, by measuring changes in the pressure of hydraulic fluid in lift cylinders 148.

Hop mitigation system 300 may include one or more hop sensors 310 configured to measure one or more of the parameters mentioned above. However, the particular parameter to be sensed, and the particular implementation of hop sensor 310 are not limited to those listed above. Other parameters that are indicative of machine hop and other sensors for measuring these parameters will be apparent to those of skill in the art.

Not all of the variation in a sensed parameter may be due to resonant hop. For example, some of the variation in the output signal H of hop sensor 310 may be due to non-resonant hop caused by roughness of surface 50. For example, machine 100 may experience a non-resonant hop when front wheels 112 hit a rut or pothole in surface 50. It may be inefficient to limit the operator-commanded aggressiveness factor $A_{cmd}$ based on these non-resonant variations in the sensed parameter. Accordingly, in an exemplary embodiment of the present disclosure, hop mitigation system 300 may filter out variations in the output H of hop sensor 310 that are due to factors other than resonant hop, and thus determine a magnitude of the resonant hop of machine 100.

In one embodiment, hop mitigation system 300 may determine the magnitude of resonant hop by passing the output H of hop sensor 310 through a filter 320. Filter 320 may be designed to pass signals having a frequency at or near the frequency $f_{hop}$ at which hop in the particular machine 100 may resonate, and reject or attenuate other signals. The resonant hop frequency $f_{hop}$ of a machine 100 may vary dependent upon, e.g., machine weight, the distribution of machine weight between front and rear wheels 122a, b, and other factors. The frequency $f_{hop}$ for a particular machine configuration may be determined empirically by testing an embodiment of the particular machine configuration under operating conditions. Alternatively, the frequency $f_{hop}$ may be estimated or determined by modeling the performance of the particular machine configuration using computer simulation techniques, or by a combination of empirical testing and simulation. For instance, $f_{hop}$ for an exemplary motor grader has been found to be approximately 3 Hz. As another example, $f_{hop}$ for a similar motor grader equipped with a snow plow has been found to be approximately 2 Hz.

In an exemplary embodiment of the present disclosure, filter 320 may include a bandpass filter having a center frequency at or near the resonant hop frequency $f_{hop}$ for the particular machine configuration. The selectivity of filter 320 may be chosen based upon empirical testing and/or simulation. In the exemplary motor grader, for instance, filter 320 may be implemented using, e.g., a fourth-order Butterworth bandpass filter having a center frequency of approximately 3 Hz and a bandwidth of approximately one Hz. However, other suitable types and configurations of filters 320 will be apparent to those of skill in the art.

As an alternative to filter 320, hop mitigation system 300 may instead determine the magnitude of resonant hop by determining the power of the output H of hop sensor 310 at or near the resonant hop frequency $f_{hop}$. In the exemplary motor grader, for instance, hop mitigation system 300 may be configured to perform, e.g., a fast Fourier transform (FFT) function on the output signal H of hop sensor 310, in order to determine the power of the signal H at or near 3 Hz.

The output of filter 320 (or, alternatively, of the FFT function) is a signal $H_{res}$ that corresponds to that portion of the output H of sensor 310 that is due to resonant hop of machine 100. In one embodiment, hop mitigation system 300 may apply an absolute-value function 330 to the filtered signal $H_{res}$ in order to normalize variation in the sensed parameter at both a leading edge and a falling edge of a machine hop. System 300 may also apply a rate-limiting function 340 in order to smooth the normalized signal $|H_{res}|$. The final output $H_{amp}$ of rate limiting function 340 is a signal having a value corresponding to the magnitude of the resonant hop of machine 100.

As illustrated in FIG. 3, where hop mitigation system 300 includes more than one hop sensor 310, for example, where system 300 includes a plurality of sensors 310 for sensing the pressure in left and right hydrostatic transmissions 220, or the pressure in left and right front wheel clutches 222, or the speed of left and right front wheels 112, etc., the final outputs $H_{amp}$ from each of the sensors 310 may be input to a maximum value function 350. Maximum value function 350 may output a maximum hop signal $H_{max}$ corresponding to the maximum value of the signals $H_{amp}$ from the various hop sensors 310. Where system 300 includes only a single hop sensor, maximum value function 350 may be omitted.

The maximum hop signal $H_{max}$ from maximum value function 330 may be input to an over-hop detector 360. Over-hop detector 360 may compare the value of maximum hop signal $H_{max}$ to the value of a hop tolerance $H_{tol}$. The value of hop tolerance $H_{tol}$ represents a value of the sensed parameter that corresponds to a magnitude of resonant machine hop that is considered to be acceptable during operation of machine 100. The value of $H_{tol}$ may be set in a memory (not shown) based on empirical testing and/or simulation of the operation of the particular machine configuration. Over-hop detector 360 determines the amount, if any, by which the value of maximum hop signal $H_{max}$ exceeds the hop tolerance $H_{tol}$ and outputs an over-hop signal $H_{ovr}$ having a value corresponding to the excess $H_{max}$-$H_{tol}$.

A hop controller 370 may receive the over-hop signal $H_{ovr}$ output by over-hop detector 340. Hop controller 370 may then output a hop-limited aggressiveness factor $A_{hop}$ based on the value of the over-hop signal $H_{ovr}$.

The hop-limited aggressiveness factor $A_{hop}$ may correspond to the maximum aggressiveness factor allowable if the excess resonant hop indicated by over-hop signal $H_{ovr}$ is to be eliminated. The magnitude of the hop-limited aggressiveness factor $A_{hop}$ output by hop controller 370 may be inversely proportional to the magnitude of the over-hop signal $H_{ovr}$. That is, the greater the difference between the magnitude of resonant hop $H_{amp}$ and the hop tolerance $H_{tol}$, the lower the value of the resulting hop-limited aggressiveness factor $A_{hop}$.

In one embodiment consistent with the present disclosure, hop controller 370 may be a proportional-integral-derivative (PID) controller. In this case, hop controller 370 may include appropriate loop gain and derivative gain factors. In addition, the derivative term may be passed through a low-pass filter, e.g., a first-order low-pass filter, in order to limit the effects of noise and of sudden changes in the output of sensor 310. However, hop controller 370 is not limited to any particular type of controller, and any of a variety of other appropriate controllers known to those skilled in the art may also be used. For example, hop controller 370 may also be implemented using a proportional-integral (PI) controller.

An aggressiveness manager 380 may receive the hop-limited aggressiveness factor $A_{hop}$ from hop controller 370 and the operator-commanded aggressiveness factor $A_{cmd}$ from aggressiveness input 244 and output an adjusted aggressiveness factor $A_{adj}$ based upon signals $A_{cmd}$ and $A_{hop}$. For example, the adjusted aggressiveness factor $A_{adj}$ may correspond to the lower of the aggressiveness factors indicated by signals $A_{cmd}$ and $A_{hop}$. Hop mitigation system 300 may then output the adjusted aggressiveness factor $A_{adj}$ to AWD controller 230. In one embodiment, aggressiveness manager 380 may override the operator-commanded aggressiveness factor $A_{cmd}$ with the adjusted aggressiveness factor $A_{adj}$. Thus, the magnitude of the adjustment to the operator-commanded aggressiveness factor $A_{cmd}$, i.e., the difference between $A_{cmd}$ and $A_{adj}$, may be directly proportional to the value of the over-hop signal $H_{ovr}$. That is, the magnitude of the adjustment $A_{cmd}$-$A_{hop}$ may be directly proportional to the difference in value between the magnitude of resonant hop $H_{amp}$ and the hop tolerance $H_{tol}$.

AWD controller 230 may use the adjusted aggressiveness factor $A_{adj}$ from aggressiveness manager 380 to adjust the driven speed of front wheels 112. For example, controller 230 may command HYSTATs 220 to drive front wheels 112 at a speed corresponding to the speed of rear wheels 122a, b multiplied by the adjusted aggressiveness factor $A_{adj}$, thus eliminating the excess resonant hop. As a result, AWD controller 230, in conjunction with hop mitigation system 300, may provide closed-loop control of machine hop.

Alternatively, AWD controller 230 may further condition the adjusted aggressiveness factor $A_{adj}$ prior to commanding HYSTATs 220. For example, AWD controller 230 may further condition the adjusted aggressiveness factor $A_{adj}$ to compensate for differences in the speed of rotation of the right and left front wheels 112 during turns.

INDUSTRIAL APPLICABILITY

Hop mitigation systems consistent with the present disclosure may be applied to a variety of self-propelled work machines. By providing for the reduction of the aggressiveness factor in proportion to the magnitude of excess hop, the hop mitigation system of the present disclosure allows the control of hop in machines having front and rear wheels driven by separate transmissions. By filtering out non-resonant hop, the hop mitigation system of the present disclosure allows self-propelled machines to be operated more efficiently. In operation, the hop mitigation system of the present disclosure provides for the operation of self-propelled machines at maximum aggressiveness without unacceptable hop.

It will be apparent to those skilled in the art that various modifications and variations can be made in the disclosed systems and methods without departing from the scope of the disclosure. Other embodiments of the disclosure will be apparent to those skilled in the art from consideration of the specification and practice of the disclosure disclosed herein. It is intended that the specification and examples be considered as exemplary only, with a true scope of the disclosure being indicated by the following claims.

What is claimed is:

1. A method for mitigating hop in a propelled machine, the method comprising:
   receiving an aggressiveness command based on an operator input, wherein the aggressiveness command indicates a desired speed ratio between two independently controllable transmissions of the propelled machine;
   measuring a parameter indicative of hop, and determining a magnitude of machine hop based on the measurement; and
   reducing an aggressiveness indicated by the aggressiveness command in proportion to the indicated magnitude of machine hop.

2. The method of claim 1, wherein determining a magnitude of machine hop includes determining a magnitude of resonant hop of the machine.

3. The method of claim 1 wherein reducing the aggressiveness includes:
   comparing the magnitude of machine hop to a hop tolerance; and
   reducing the aggressiveness indicated by the aggressiveness command in proportion to an amount, if any, by which the magnitude of machine hop exceeds the hop tolerance.

4. The method of claim 1, wherein reducing the aggressiveness includes:
   performing a proportional-integral-derivative control algorithm based on the magnitude of machine hop; and
   using an output of the proportional-integral-derivative control algorithm to limit the aggressiveness command.

5. A method for mitigating hop in a propelled machine, the method comprising:
   receiving an aggressiveness command based on an operator input;
   measuring a parameter indicative of hop, wherein measuring a parameter indicative of hop includes measuring a parameter indicative of at least one of: speed of a front wheel of the machine, pressure in a clutch configured to drive a front wheel of the machine, pressure in a transmission configured to drive a front wheel of the machine, torque output of a transmission configured to drive a front wheel of the machine, acceleration of a front portion of the machine, and pressure in a lift cylinder of an implement of the machine;
   determining a magnitude of machine hop based on the measurement; and
   reducing an aggressiveness indicated by the aggressiveness command in proportion to the indicated magnitude of machine hop.

6. A method for mitigating hop in a propelled machine, the method comprising:
   receiving an aggressiveness command based on an operator input;
   measuring a parameter indicative of hop, wherein measuring a parameter indicative of hop includes providing a sensor configured to output a hop signal indicative of a magnitude of machine hop;
   determining a magnitude of machine hop based on the measurement, wherein determining a magnitude of machine hop includes determining a magnitude of resonant hop of the machine and wherein determining a magnitude of resonant hop of the machine includes passing the hop signal through a bandpass filter; and
   reducing an aggressiveness indicated by the aggressiveness command in proportion to the indicated magnitude of machine hop.

7. The method of claim 6, wherein the bandpass filter has a center frequency at or near a frequency of resonant hop of the machine.

8. The method of claim 6, wherein the bandpass filter has a center frequency between approximately 2 Hz and approximately 3 Hz.

9. A method for mitigating hop in a propelled machine, the method comprising:
   receiving an aggressiveness command based on an operator input;
   measuring a parameter indicative of hop, wherein measuring a parameter indicative of hop includes providing a sensor configured to output a hop signal indicative of a magnitude of machine hop;
   determining a magnitude of machine hop based on the measurement, wherein determining a magnitude of machine hop includes determining a magnitude of resonant hop of the machine and wherein determining a magnitude of resonant hop of the machine includes determining a power of the hop signal at a particular frequency; and
   reducing an aggressiveness indicated by the aggressiveness command in proportion to the indicated magnitude of machine hop.

10. The method of claim 9, wherein the particular frequency is at or near a frequency of resonant hop of the machine.

11. The method of claim 9, wherein the particular frequency is between approximately 2 Hz and approximately 3 Hz.

12. A system for mitigating hop in a propelled machine, the system comprising:
    a controller operable to receive an aggressiveness command based on an operator input, wherein the aggressiveness command indicates a desired speed ratio between two independently controllable transmissions of the propelled machine;

a sensor operable to measure a parameter indicative of hop and output a hop signal indicative of a magnitude of machine hop, based on the measurement; and a manager operable to reduce an aggressiveness indicated by the aggressiveness command in proportion to the indicated magnitude of machine hop.

13. The system of claim 12, wherein the hop signal is indicative of a magnitude of resonant hop of the machine.

14. The system of claim 12, further including a detector operable to compare the hop signal to a hop tolerance; and wherein the manager is operable to reduce an aggressiveness indicated by the aggressiveness command in proportion to an amount, if any, by which the magnitude of machine hop exceeds the hop tolerance.

15. The system of claim 12, further including:

a proportional-integral-derivative controller operable to calculate a hop-limited aggressiveness command based on the magnitude of machine hop, the manager operable to override the aggressiveness command based on operator input with the hop-limited aggressiveness command.

16. A system for mitigating hop in a propelled machine, the system comprising:

a controller operable to receive an aggressiveness command based on an operator input;

a sensor operable to measure a parameter indicative of hop and output a hop signal indicative of a magnitude of machine hop, based on the measurement, wherein the sensor is operable to measure a parameter indicative of at least one of: speed of a front wheel of the machine, pressure in a clutch configured to drive a front wheel of the machine, pressure in a transmission configured to drive a front wheel of the machine, torque output of a transmission configured to drive a front wheel of the machine, acceleration of a front portion of the machine, and pressure in a lift cylinder of an implement of the machine; and a manager operable to reduce an aggressiveness indicated by the aggressiveness command in proportion to the indicated magnitude of machine hop.

17. A system for mitigating hop in a propelled machine, the system comprising:

a controller operable to receive an aggressiveness command based on an operator input;

a sensor operable to measure a parameter indicative of hop and output a hop signal indicative of a magnitude of machine hop, based on the measurement, wherein the hop signal is indicative of a magnitude of resonant hop of the machine;

a bandpass filter operable to limit the bandwidth of the hop signal,;

a detector operable to compare the magnitude of the bandwidth-limited hop signal to a hop tolerance; and a manager operable to reduce an aggressiveness indicated by the aggressiveness command in proportion to the indicated magnitude of machine hop.

18. The system of claim 17, wherein the bandpass filter has a center frequency at or near a frequency of resonant hop of the machine.

19. The system of claim 17, wherein the bandpass filter has a center frequency between approximately 2 Hz and approximately 3 Hz.

20. A system for mitigating hop in a propelled machine, the system comprising:

a controller operable to receive an aggressiveness command based on an operator input;

a sensor operable to measure a parameter indicative of hop and output a hop signal indicative of a magnitude of machine hop, based on the measurement, wherein the hop signal is indicative of a magnitude of resonant hop of the machine;

a transform function operable to determine a power of the hop signal proximate a particular frequency; and a manager operable to reduce an aggressiveness indicated by the aggressiveness command in proportion to the power of the hop signal.

21. The system of claim 20, wherein the particular frequency is at or near a frequency of resonant hop of the machine.

22. The system of claim 20, wherein the particular frequency is between approximately 2 Hz and approximately 3 Hz.

23. A propelled machine having front and rear wheels, the propelled machine comprising:

an AWD system;

a controller operable to receive an aggressiveness command based on an operator input and to drive front wheels of the machine at a speed related to a speed of rear wheels of the machine, based on the aggressiveness command;

a sensor operable to measure a parameter indicative of hop and output a hop signal indicative of a magnitude of machine hop, based on the parameter; and a manager operable to reduce an aggressiveness indicated by the aggressiveness command in proportion to the indicated magnitude of machine hop.

24. The propelled machine of claim 23, wherein the aggressiveness command indicates a desired speed ratio between two independently controllable transmissions of the propelled machine.

25. The propelled machine of claim 23, wherein the sensor is operable to measure a parameter indicative of at least one of: speed of a front wheel of the machine, pressure in a clutch configured to drive a front wheel of the machine, pressure in a transmission configured to drive a front wheel of the machine, torque output of a transmission configured to drive a front wheel of the machine, acceleration of a front portion of the machine, and pressure in a lift cylinder of an implement of the machine.

26. The propelled machine of claim 23, wherein the hop signal is indicative of a magnitude of resonant hop of the machine.

27. The propelled machine of claim 26, further including a bandpass filter operable to limit the bandwidth of the hop signal, the detector operable to compare the magnitude of the bandwidth-limited hop signal to the hop tolerance.

28. The propelled machine of claim 27, wherein the bandpass filter has a center frequency at or near a frequency of resonant hop of the machine.

29. The propelled machine of claim 27, wherein the bandpass filter has a center frequency between approximately 2 Hz and approximately 3 Hz.

30. The propelled machine of claim 26, further including a transform function operable to determine a power of the hop signal proximate a particular frequency, the manager operable to reduce an aggressiveness indicated by the aggressiveness command in proportion to the power of the hop signal.

31. The propelled machine of claim 30, wherein the particular frequency is at or near a frequency of resonant hop of the machine.

32. The propelled machine of claim 30, wherein the particular frequency is between approximately 2 Hz and approximately 3 Hz.

33. The propelled machine of claim 23, further including a detector operable to compare the hop signal to a hop tolerance; and
  wherein the manager is operable to reduce an aggressiveness indicated by the aggressiveness command in proportion to an amount, if any, by which the magnitude of machine hop exceeds the hop tolerance.

34. The propelled machine of claim 23, further including:
  a proportional-integral-derivative controller operable to calculate a hop-limited aggressiveness command based on the magnitude of machine hop, the manager operable to override the aggressiveness command based on operator input with the hop-limited aggressiveness command.

* * * * *